Oct. 24, 1944.  E. G. MUELLER  2,360,967
BRAKE MECHANISM
Filed April 10, 1943  3 Sheets-Sheet 1

INVENTOR
Emil G. Mueller
BY
HIS ATTORNEY

Oct. 24, 1944.     E. G. MUELLER     2,360,967
BRAKE MECHANISM
Filed April 10, 1943     3 Sheets-Sheet 2

INVENTOR
*Emil G. Mueller*
BY
*A. R. Vinnill*
HIS ATTORNEY

Patented Oct. 24, 1944

2,360,967

UNITED STATES PATENT OFFICE 2,360,967

BRAKE MECHANISM

Emil G. Mueller, Churchill Borough, Pa., assignor to The American Brake Company, Swissvale, Pa., a corporation of Missouri Application April 10, 1943, Serial No. 482,600

13 Claims. (Cl. 188—46)

My invention relates to brake mechanism, and particularly to brake mechanism for applying clasp brakes to the driving wheels of locomotives.

In modern high speed locomotives it is frequently desirable to arrange the wheels of adjacent pairs of driving wheels as closely together as the necessary clearance between the wheels themselves will permit in order to keep the overall length of the locomotive to a minimum to facilitate the negotiation of curves by the locomotive. It is also frequently desirable to arrange one or more of the driving wheels for lateral movement with respect to the locomotive frame to enable the wheels to freely follow the track rails on curves or uneven stretches of track without undue side-thrust of the wheels on the rails.

When the driving wheels of a locomotive are arranged closely together in the manner described, there is, of course, no room for inserting any part of the brake mechanism directly between the wheel centers, and the available space between the wheels above their centers is frequently limited by the valve gear or other parts of the locomotive, while the space between the wheels below their centers is limited by the diameters of the wheels and the necessary track clearance which must be provided. As a result, if the wheels have relatively small diameters, the only way in which clasp brakes can be applied to the wheels is to place the two shoes which engage the wheels at the contiguous sides of the wheels one above and the other below the plane passing through the wheel centers. With this arrangement the two shoes between the adjacent closely spaced wheels will be oppositely disposed and will cooperate with different wheels, thus making it difficult to provide a satisfactory mechanism for properly operating and supporting the brake shoes.

One object of my invention is to provide an improved mechanism which makes it possible to satisfactorily support and operate clasp brakes for the wheels of a locomotive arranged as above described.

Another object of my invention is to provide an improved brake hanger assembly capable of supporting the two brake shoes between the adjacent closely spaced driving wheels in such manner that the minimum permissible spacing between the driving wheels need be no greater than that required for the wheels to clear themselves, and which at the same time will permit the brake shoes associated with the laterally movable wheels to be readily moved laterally a sufficient amount to maintain them in lateral alignment with the wheels.

A further object of my invention is to provide brake mechanism which can be satisfactorily mounted within the limited space available for the brake rigging on a locomotive of the type described without interference from or with the other parts of the locomotive.

Brake mechanism embodying my present invention is an improvement upon that described and claimed in my prior Patent No. 2,242,015, granted on May 13, 1941, and also upon that described and claimed in my prior Patent No. 2,275,916, granted on March 10, 1942.

According to my invention, the two brake shoes which are disposed between the closely spaced wheels of contiguous pairs of wheels are secured, some distance above and below, respectively, the plane passing through the wheel centers, to inwardly offset portions formed on the opposite ends of a vertically disposed compound supporting lever, the main portion of which is located outside of the plane of the wheels. The two supporting levers disposed at the opposite sides of the locomotive, in turn, are pivotally supported at their upper ends on the opposite ends of a horizontally disposed brake beam by means of bearing blocks so constructed that the levers are free to rotate about the axis of the brake beam and also to swing laterally relative to the locomotive frame a sufficient amount to permit the brake shoes which cooperate with the laterally movable wheels to move laterally the same amount that the laterally movable wheels are permitted to move. The said brake beam is slidably supported adjacent its ends for movement longitudinally of the locomotive in suitable guides provided on the locomotive frame. A second brake beam is connected at its ends with the lower ends of the supporting levers by means of bearing blocks similar to those which connect the upper beam with the upper ends of the levers, and is operatively connected with means for moving it, and hence moving the two supporting levers laterally in response to the lateral movement of the wheels to cause the brake shoes associated with the laterally movable wheels to follow the lateral movements of these wheels. The brake shoes at the forward sides of the laterally movable wheels are supported by supporting levers connected at their lower ends by a brake beam, and the brake shoes at the rear sides of the fixed pair of wheels are similarly supported. The forward pair of levers are supported for lateral as well as horizontal swinging movement to permit the associated shoes to follow the lateral movements of the wheels and the associated brake beam is connected with means for moving these levers laterally in response to lateral movement of the laterally movable wheels. Suitable linkage is provided for simultaneously moving the brake beams in directions to move the brake shoes toward the wheels to their braking positions and novel spring means are provided for moving the brake beams in the direction to release the brakes.

Other objects and characteristic features of my invention will become apparent as the description proceeds.

I shall describe one form of brake mechanism embodying my invention, and shall then point out the novel features thereof in claims.

In the accompanying drawings.

Similar reference characters refer to similar parts in each of the several views.

Referring to the drawings, the locomotive to which I have shown my invention applied is of the type having four pairs of driving wheels, the first and second pairs of which are driven from a first set of steam cylinders and the third and fourth pairs of which are driven from a second set of steam cylinders. All four pairs of driving wheels are mounted in a rigid frame 1, only the third and fourth pairs 2 and 3 of driving wheels and a portion of the second pair 4 being illustrated in the drawings.

Each pair of driving wheels is mounted on an axle comprising a part of a roller bearing axle assembly, the construction of which forms no part of my present invention, and is therefore not shown in detail in the drawings. It should be particularly pointed out, however, that the axle assembly for the third pair of driving wheels 2 is journaled at each end in a journal box (not shown) formed in the side member of the frame 1 in such manner that the journal box is free to slide vertically and laterally with respect to the frame, and each axle assembly includes a member 5 (see Fig. 1) which connects the two journal boxes and is movable laterally therewith. This member may assume a variety of forms depending upon the particular type of roller bearing construction employed, and is here shown as being tubular in construction. This member is referred to in the art by a variety of different designations, but for convenience I shall hereinafter refer to it as an axle housing, although it should be distinctly understood that insofar as my present invention is concerned its exact construction is immaterial so long as it is a non-rotatable member which moves laterally in response to lateral movement of the associated driving wheels. The member 5 is provided at its center with two pairs of spaced depending lugs 6 and 7 (see Fig. 2) for a purpose which will appear presently. It should be noted that the wheel and axle assembly just described is free to move laterally through a sufficient distance to permit the wheels to freely follow the track rails on curves without causing undue sidethrust of the flanges of one or the other of the wheels on the adjacent rails, this distance in actual practice being about one inch in either direction from the normal central position.

The wheel and axle assembly for the fourth pair of driving wheels 3 is of the usual construction, and is not adapted to move any appreciable distance laterally with respect to the truck frame. Due to the usual operating clearances this wheel and axle assembly may at times be moved laterally with respect to the truck frame, but such movement will be so slight that the assembly will at no time strain the brake rigging or interfere with its proper operation. That is to say, insofar as my present invention is concerned, this wheel and axle assembly may be considered as fixed against lateral movement.

It will be observed that the driving wheels 2 and 3 are closely spaced, the distance between these wheels preferably being no greater than the necessary clearance between the wheels themselves will require. The reason for closely spacing the wheels in this manner is to decrease the overall length of the locomotive to a minimum to facilitate its ability to negotiate curves.

Extending transversely of the wheels 2 and 3 considerably below the horizontal plane passing through their centers are brake beams 9, 10 and 11, and extending transversely of the wheels 2 and 3 considerably above the horizontal plane passing through their centers is another brake beam 12, this latter beam being disposed directly above the brake beam 10.

Figure 4:
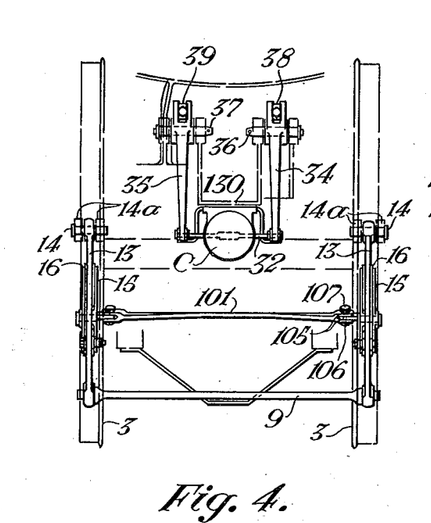
Fig. 4 is a left-hand end view of the brake mechanism shown in the preceding views.

The brake beam 9 is supported for movement toward and away from the wheels 3 between brake applying and brake releasing positions by means of a pair of hanger levers 13 (see Fig. 4), the upper ends of which are pivotally secured to the locomotive frame by means of pins 14 mounted in suitable bosses 14a provided on the engine frame, and the lower ends of which are pivotally connected with the opposite ends of the brake beam. Secured to each of the levers 13 intermediate its ends is a brake head 15 carrying a brake shoe 16 which, when the brake beam is moved to its brake applying position is adapted to engage the associated wheel 3 in a zone located some distance below the horizontal plane passing through the axis of the wheel.

The brake beam 11 is supported for swinging movement toward and away from the wheels 2 by means of a pair of hanger levers 17 provided at their upper ends with spaced jaws 18 (see Fig. 1) which form a recess 19, and at their lower ends with other spaced jaws 20 which form a recess 21. The recesses 19 each receive a clevis block 22 (see Fig. 8) which is pivotally attached to the lever by means of a pin 23 extending through the jaws 18 longitudinally of the locomotive and to a suitable support, provided on the engine frame 1, by means of a pin 24 extending transversely of the locomotive directly below the pin 23. The block 22 and two pins 23 and 24 provide what may be termed a universal joint whereby the levers 17 are free to swing toward and away from the wheels and also to rock in directions transversely of the locomotive frame.

The recesses 21 loosely receive the ends of the brake beam 11, and extending through aligned openings provided in the jaws 20 and the ends of the brake beam are pins 25 which loosely fasten the brake beam to the levers. Each lever is provided intermediate its ends with a brake head 15 carrying a brake shoe 16 for cooperation with the wheels 2. It will be remembered that the wheels 2 are free to move laterally relative to the engine frame through a considerable distance, and the parts are so proportioned that the levers 17 and brake beam 11 are free to swing laterally through a sufficient distance to permit the associated brake shoes 16 to remain at all times in lateral alignment with the wheels 2 without strain on any of the brake parts.

Figures 1, 7, 8, 9:
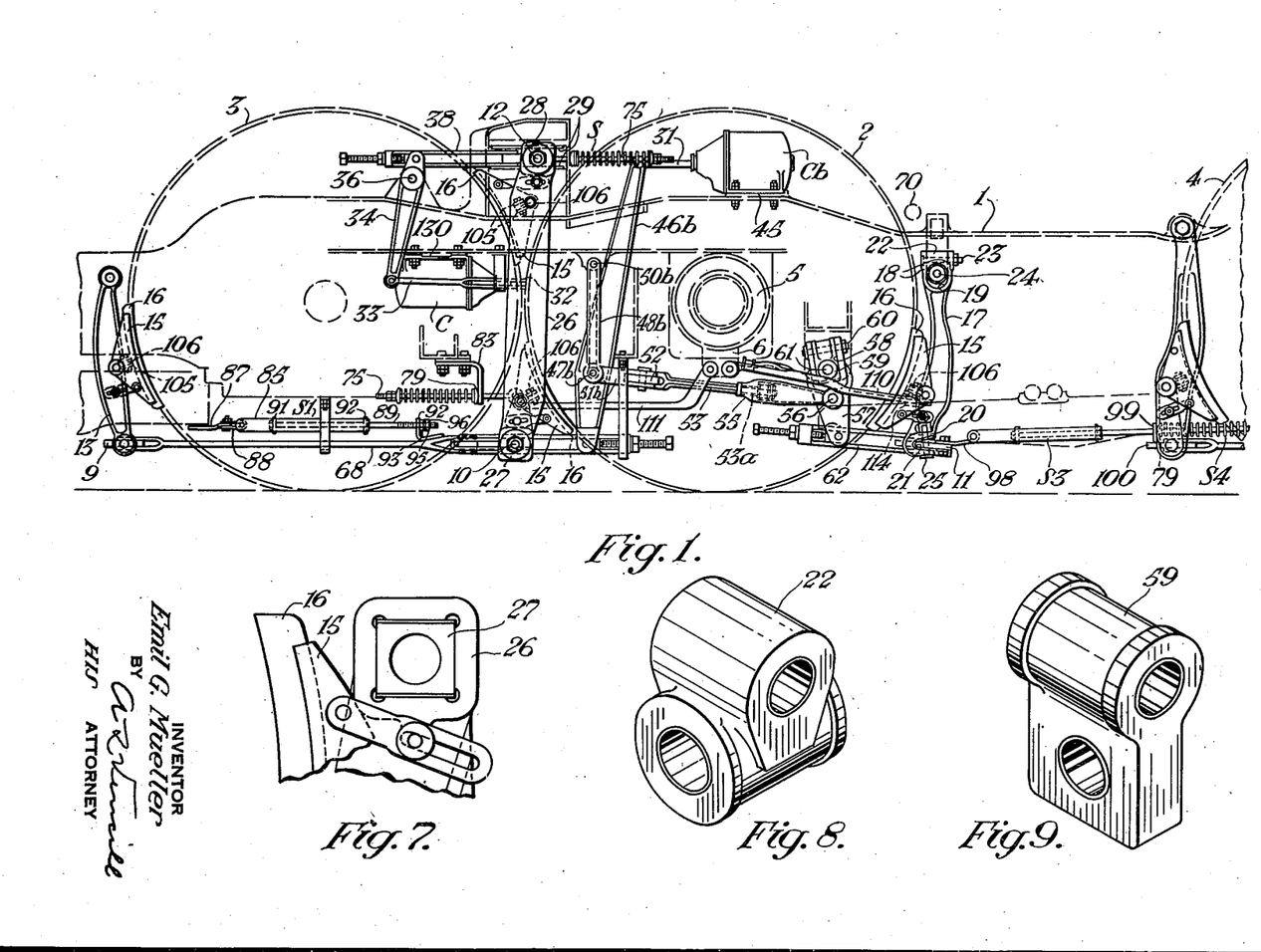
Fig. 1 is a side elevational view of the third and fourth pairs of driving wheels of a locomotive of the type described having applied thereto brake mechanism embodying my invention.
Fig. 7 is an enlarged fragmentary view of a portion of the brake mechanism shown in the preceding views.
Figs. 8 and 9 are enlarged views showing certain of the parts of the brake mechanism in isometric projection.
Figure 2:
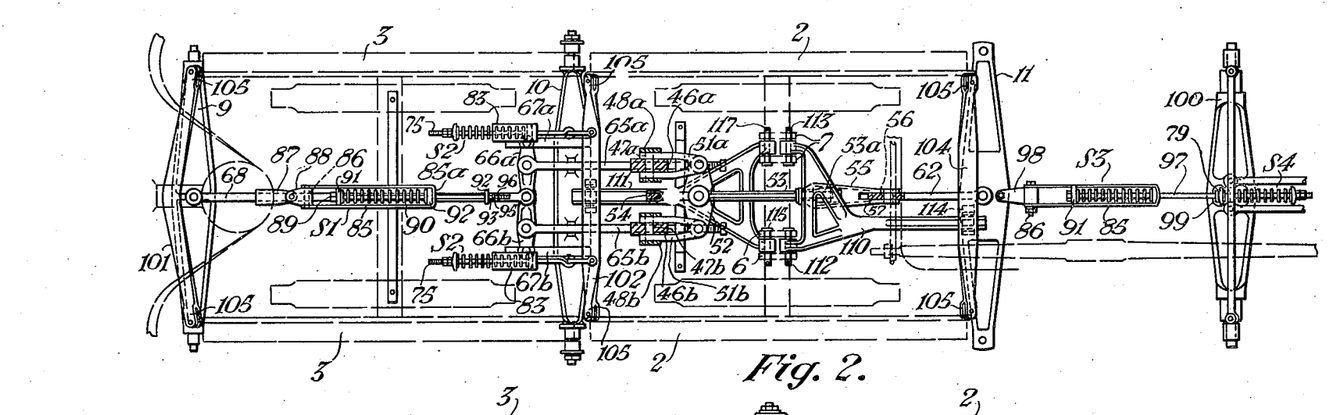
Figs. 2 and 3 are top plan views illustrating different portions of the brake mechanism shown in Fig. 1, certain of the parts being omitted for the sake of clearness.
Figure 6:
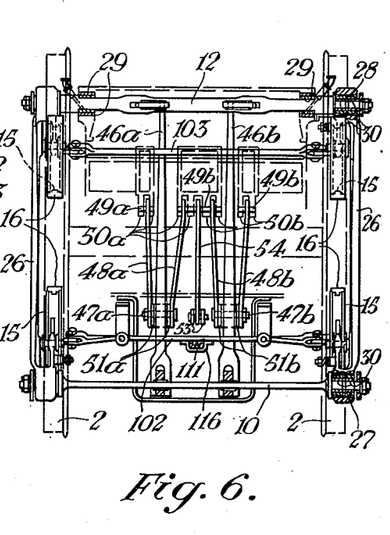
Fig. 6 is a transverse sectional view of that portion of the brake mechanism located between the third and fourth pairs of driving wheels.

The brake beam 10 is supported for swinging movement toward and away from the wheels 2 between brake applying and brake releasing positions by means of a pair of compound levers 26. These latter levers are pivotally connected at their lower ends to the opposite ends of the brake beam 10 by means of bearing blocks 27 (see Fig. 6), and are pivotally mounted at their upper ends on the opposite ends of the brake beam 12 by means of other bearing blocks 28. The brake beam 12, in turn, is slidably supported adjacent its ends for movement between brake applying and brake releasing positions by means of supporting guides 29 provided on the engine frame. As best seen in Figs. 6 and 7, each bearing block is disposed in a square hole in the lever and is mounted on a pair of spaced sleeves 30 which surround the rounded end of the associated beam and has its upper and lower surface sloped or rounded from the center toward each end in a manner to permit the lower end of the lever to swing laterally at least as far as the wheels 2 are permitted to move laterally.

As best seen in Fig. 6, the central portion of each lever 26 is disposed outside of the plane of the contiguous wheels, but the upper and lower ends are provided with inwardly offset portions which are disposed within the plane of the wheels and which carry brake heads 15 provided with brake shoes 16. Each upper brake shoe 16 is adapted, when the brake beam 12 is moved to its brake applying position, to engage the adjacent wheel 3 in a zone which is substantially diametrically opposite to the zone at which the brake shoe 16 secured to the lever 13 is adapted to engage this wheel, while each lower brake shoe 16 is adapted, when the brake beam 10 is moved to its brake applying position to engage the adjacent wheel 2 in a zone which is located below the center of the wheel substantially the same distance as the zone at which the brake shoe 16 secured to the opposite lever 17 is adapted to engage this wheel.

It should be particularly noted that the reason for securing the levers 26 to the brake beams 10 and 12 by means of the bearing blocks 27 and 28 in the manner previously described is to enable the lower ends of the levers 26 to be moved laterally in a manner which I shall describe presently through a sufficient distance to cause the lower brake shoes 16 carried by these levers to remain at all times in lateral alignment with the wheels 2.

The brake mechanism also includes a first set of interconnected rods and levers actuated by a first brake cylinder C for moving the brake beam 12 to its brake applying position, and a second set of interconnected rods and levers actuated by a pair of brake cylinders Ca and Cb for moving the remaining brake beams 9, 10 and 11 to their brake applying positions.

The brake cylinder C is disposed between the wheels 3 above and in front of the axle connecting these wheels, and is secured to a suitable support 130 provided on the engine frame. This cylinder includes the usual cylinder body, reciprocable piston (not shown) biased to the inner end of its stroke by the usual release spring (not shown), and a push rod 31 which is operatively connected with the piston.

The push rod 31 is operatively connected at its outer end with an equalizer lever 32 intermediate its ends, and the equalizer lever 32, in turn, is operatively connected at its ends through the medium of pull rods 33 with the lower ends of two similar laterally spaced vertically extending brake cylinder levers 34 and 35. The brake cylinder levers 34 and 35 are pivotally supported intermediate their ends on spaced pivot pins 36 and 37 mounted in spaced lugs provided on the engine frame, and are operatively connected at their upper ends through the medium of pull rods 38 and 39 with the brake beam 12 at points equally spaced from its ends. The pull rods 38 and 39 include slack adjusters of the usual and well known construction, and since these slack adjusters are of the usual and well known construction it is believed to be unnecessary to describe them herein.

The brake cylinders Ca and Cb are each similar to the brake cylinder C, and are disposed between the wheels 2 on opposite sides of the center line of the locomotive slightly in advance of the axle connecting the wheels 2. These latter cylinders are secured to suitable supports 45 provided on the engine frame.

The push rod 31 of the brake cylinder Ca is pivotally connected at its outer end with the upper end of a vertically disposed brake cylinder lever 46a, and the push rod 31 of the cylinder Cb is similarly pivotally connected at its outer end with the upper end of a vertically disposed brake cylinder lever 46b. The two brake cylinder levers 46a and 46b are of the floating type and are floatingly supported intermediate their ends on pivot pins 47a and 47b mounted respectively in the lower ends of associated pairs of hanger links 48a and 48b disposed on opposite sides of the levers. The hanger links 48a and 48b, in turn, are pivotally attached to the engine frame by means of pivot pins 49a and 49b mounted in depending lugs 50a and 50b secured to the engine frame. Also mounted on the pivot pins 47a and 47b are double jaws 51a and 51b which serve as a means for operatively connecting the levers intermediate their ends with the opposite ends of an equalizer lever 52.

The equalizer lever 52 is pivotally attached intermediate its ends to a pull rod 53 intermediate its ends. The pull rod 53 is suspended at one end from the engine frame by means of a hanger link 54, and is provided at its opposite end with a jaw 55 mounted on a rounded portion 53a of the lever in such manner that the jaw is free to rotate relative to the axis of the lever. The jaw 55 is pivotally attached by means of a pivot pin 56 to a vertically disposed transmitting lever 57 intermediate its ends. The transmitting lever 57 is provided at its upper end with a jaw 58 which receives a clevis block 59 (see Fig. 9) with some clearance. The clevis block 59 is pivotally attached to the transmitting lever by means of a pivot pin 60 extending longitudinally of the locomotive, and to the locomotive frame by means of a pivot pin 61 extending transversely of the locomotive. The clevis block 59 and two pivot pins 60 and 61 provide what may be termed a universal joint whereby the lower end of the transmitting lever is free to swing both longitudinally and transversely with respect to the locomotive. The lower end of the transmitting lever 59 is connected by means of a pull rod 62 with the brake beam 11. The pull rod 62 includes a slack adjuster of the usual and well known construction.

The lower ends of brake cylinder levers 46a and 46b are operatively connected through the medium of pull rods 65a and 65b respectively with horizontally disposed equalizer levers 66a and 66b intermediate their ends. The equalizer levers 66a and 66b are pivotally attached at their outer ends to the brake beam 10 at points equally spaced from its ends by means of strap links 67a and 67b, and are each pivotally connected at their opposite ends to one end of a pull rod 68, the opposite end of which is pivotally connected with the brake beam 9 intermediate its ends.

When it is desired to apply the brakes, fluid pressure is simultaneously supplied to all three brake cylinders C, Ca and Cb. The fluid supplied to the cylinder C causes the associated push rod 31 to move outwardly in the cylinder in opposition to the bias of the release springs, and this outward movement acts through the associated set of interconnected rods and levers to move the brake beam 12 to its brake applying position in a manner which will be obvious from an inspection of the drawings.

The fluid pressure supplied to the cylinders Ca and Cb likewise causes the push rods 31 associated with these cylinders to move outwardly in the cylinders and hence causes the upper ends of the brake cylinder levers 46a and 46b to move toward the left as viewed in Fig. 1. This movement of the levers 46a and 46b, in turn, acts through the double jaws 51a and 51b, the equalizer lever 52, pull rod 53, transmitting lever 57, and pull rod 62 to move the brake beam 11 to its brake applying position, and also acts through the pull rods 65a and 65b, the equalizer levers 66a and 66b and the strap links 67a and 67b to move the brake beam 10 to its brake applying position, and through the pull rod 68 to move the brake beam 9 to its brake applying position.

As was pointed out hereinbefore, when the brake beams are moved to their brake applying positions, the brake shoes will frictionally engage the wheels, whereby each wheel will be clasped between a pair of brake shoes, and the parts are so proportioned that the braking forces exerted by the brake shoes on each wheel will be approximately equal.

When the fluid supplied to the brake cylinders of the brake mechanism is subsequently vented to atmosphere, the release springs in the brake cylinders will restore the push rods to their retracted positions, which movement removes the force tending to move the brake shoes 16 against the wheels. However, the friction which inherently exists between the brake beam 12 and the associated supporting guides 29 opposes the movement of this brake beam to its brake releasing position, and since there is usually a certain amount of unavoidable lost motion between the interconnected rods and levers which actuate this brake beam, the brake shoes attached to the upper ends of the supporting levers 26 will have a tendency to drag.

Figure 3:
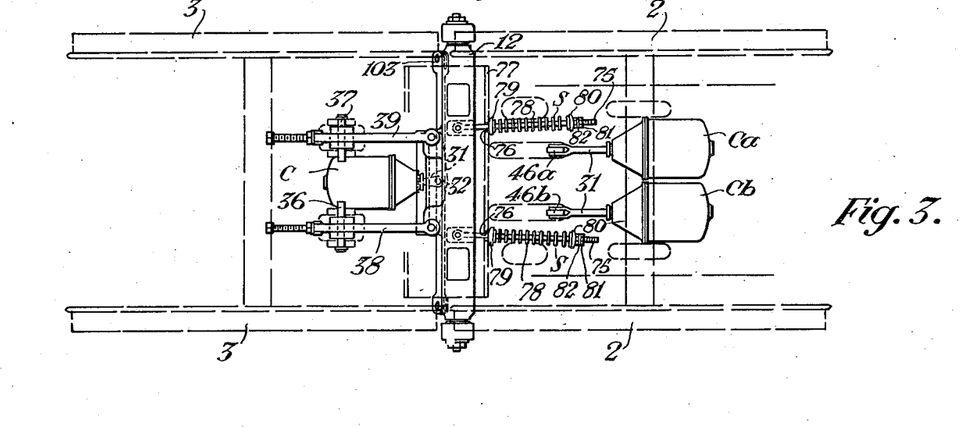

This tendency is undesirable and for the purpose of preventing it the brake beam 12 is connected with two spring units S for moving this brake beam to its brake releasing position following a brake application. These spring units are similar and each comprises a spring rod 75 pivotally attached at one end to the brake beam, and extending intermediate its ends through a supporting opening 76 provided in a transverse member 77 formed on the locomotive frame. The free end of each spring rod extends with clearance through a partially compressed coil spring 78 and two spring seats 79 and 80 which engage the opposite ends of the spring. The left-hand spring seat 79 is free to slide on the rod and bears against the member 77, while the other seat 80 is screw threaded onto the rod and cooperates with a jam nut 81 also screwed onto the spring rod. To provide added protection against the jam nut 81 loosening due to vibration a lock washer 82 is interposed between the spring seat and the jam nut 81. The parts are so proportioned that when fluid is vented from the brake cylinder C, the spring units S will move the brake beam 12 toward the right, as viewed in Figs. 1 and 3, to the desired brake releasing position.

When the brake beam 12 is moved to its brake releasing position, the necessary non-vertical position of the levers 26 causes a gravitational force to be exerted on the lower ends of these levers which tends to cause the remaining brake shoes to drag. For the purpose of overcoming this latter tendency, I provide other spring means for restoring the brake beams 9, 10 and 11 to their brake releasing positions.

The spring means for restoring the brake beam 9 to its brake releasing position comprises a spring unit S1 consisting of a frame in the form of a U-shaped strip 85 having the ends perforated and secured together by a bolt 86. The frame is secured to a support 87 (see Fig. 1) provided on the engine frame, by means of a clevis 88 which cooperates with the bolt 86, and has its end 85a pierced for the reception of a spring bolt 89. A compressed coil spring 90 surrounds the bolt 89 between a spring seat 91 disposed on the head end of the bolt and a spring seat 92 which cooperates with the end 85a, and constantly biases the bolt to the relative position with respect to the frame in which the head of the bolt engages the clevis 88. The outer end of the bolt extends with clearance through a hole formed in a bracket 92 welded to the pull rod 68 and is provided with an adjusting nut 93, a lock washer 95, and a lock nut 96. The adjusting nut is so adjusted that when fluid is vented from the brake cylinders Ca and Cb, the spring 90 will exert sufficient force on the pull rod 68 to move the brake beam 9 to its brake releasing position.

The spring means for moving the brake beam 10 to its brake releasing position comprises two spring units S2 each similar to the spring units S described above. The spring rod 75 of each of these spring units passes through a supporting bracket 83 provided on the engine frame in such manner that the outer ends of the spring seat 79 of the unit bears against the left-hand side of the bracket, as viewed in Fig. 1, and has its free end secured to a tie rod 102 which connects the brake heads 15 disposed at the rear sides of the driving wheels for a purpose which will be made clear presently. The parts of the spring units S2 are so adjusted that these spring units will return the brake beam 10 to the desired brake releasing position when fluid is vented from the brake cylinders Ca and Cb to release the brakes.

The spring means for moving the brake beam 11 to its brake releasing position comprises two spring units S3 and S4 which are similar to the previously described units S1 and S2 respectively except for the fact that both of these units have a common spring bolt 97. The right-hand end of the spring unit S3 is secured by means of a clevis 98 to the brake beam 11. The spring bolt between the two spring units extends through a clearance hole formed in a bracket 99 secured to a brake beam 100 associated with the second pair of driving wheels 4, and the parts are so proportioned that the spring washer 79 of the spring unit S4 cooperates with the right-hand side of the bracket 99 as viewed in Fig. 1. The parts are so proportioned that when fluid is vented from the brake cylinders Ca and Cb, the spring units S3 and S4 will both exert a force on the brake beam 11 to move it to its brake releasing position.

It should be pointed out that due to the fact that the spring units S3 and S4 are connected between and supported solely by the brake beams 11 and 100, the problem of providing adequate mounting support for these parts on the locomotive is greatly simplified.

It will be noted that while the brake shoes 16 which engage the wheels 3 are diametrically opposite, the two shoes associated with the wheels 2 both engage the wheels 2 below the plane of the axle. It would be desirable to have the brake shoes associated with the wheels 2 to engage the wheels at points located diametrically opposite each other in a manner similar to the shoes associated with wheel 3 because it imposes less strain on the locomotive, but this construction is impossible due to the necessity to locate a part 70 comprising a portion of the valve gear of the locomotive at the location diametrically opposite to the left-hand brake shoe.

Figure 5:
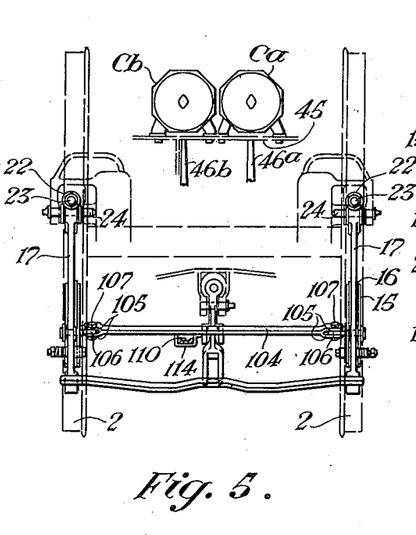
Fig. 5 is a right-hand end view of the brake mechanism shown in the preceding views.

When the brakes are applied, the very high forces which are necessarily exerted on the brake shoes tend to cause the brake shoes to ride laterally off of the taper of the wheel treads. It is essential to the proper operation of the brake mechanism that the brake shoes should remain in full frictional contact with the wheel treads at all times when the brakes are applied, and to this end the two brake heads disposed on the same side of each pair of wheels are connected together by a tie rod located as close to the wheels as the necessary operating clearances will permit. These tie rods, designated respectively by the reference characters 101, 102, 103 and 104, are generally similar in construction, and are each provided at each end with a jaw 105 which straddles a lug 106 cast on the side of the brake head (see Figs. 4, 5 and 6), and which jaw is secured to the contiguous lug by means of a tie bolt 107 extending through aligned openings provided in the jaw and the lug. It will be obvious that with the brake heads connected together by the tie rods in this manner any tendency of the brake shoes to ride laterally off of the wheels will be effectively prevented by the tie rods, thus insuring proper frictional contact between the shoes and the wheels at all times when the brakes are applied.

The brake mechanism also includes means for maintaining the brake shoes 16 associated with the laterally movable wheels 2 in lateral alignment with these wheels. This means in the form here shown comprises two rigid arms 110 and 111. The arm 110 is pivotally attached at one end to the previously described axle housing 5 by means of pivot pins 112 and 113 passing through the lugs 6 and 7 provided on the member 5, and extends at the other end into a stirrup 114 secured to the underside of the tie bar 104. The arm 111 is similarly pivotally attached at one end to the previously described axle housing 5 by means of pivot pins 115 and 117 passing through the lugs 6 and 7 provided on the member 5, and has its free end extending through a stirrup 116 secured to the tie bar 102.

It will be remembered that the axle housing 5 is constrained to follow the lateral movements of the wheels 2, and that the hanger levers 17 and supporting levers 26 are both suspended by means of universal joints which permit the associated brake beams 11 and 10 to swing laterally as well as longitudinally of the locomotive. It will be obvious therefore that when lateral movements of the wheels 2 take place, these movements will be transmitted from the axle housing through the rigid arms 110 and 111 to the brake beams 11 and 10, and thence through the levers 17 and 26 to the brake shoes associated with the wheels 2 whereby the brake shoes will remain at all times in lateral alignment with the wheels.

It will be noted that when the brake beam 11 is moved laterally, it is necessary for the operating linkage connected with this brake beam to also move laterally, and it is for this reason that the transmitting lever 57 is suspended from the engine frame by a universal joint and that the jaw 55 provided on the pull rod 53 is secured to the rod in such manner that it is free to swivel about the axis of the rod.

Although I have herein shown and described only one form of brake mechanism embodying my invention, it is understood that various changes and modifications may be made therein within the scope of the appended claims without departing from the spirit and scope of my invention.

Having thus described my invention, what I claim is:

1. In a brake mechanism for a vehicle having a frame supported by a laterally movable wheel and axle assembly, two hanger levers one for each wheel of said assembly each provided at its upper end with a jaw, two clevis blocks one disposed in each jaw and each pivotally attached to the lever by means of a pin extending through the jaw longitudinally of the vehicle and to said frame by means of a pin extending transversely of the locomotive, whereby said pins and said blocks form universal joints which permit the lower ends of said levers to swing toward and away from the associated wheels and also to rock in directions transversely of the vehicle frame, brake elements secured to said hanger levers for cooperation with the associated wheels, means connected with the hanger levers for moving them toward and away from the wheels to braking and non-braking positions, and other means connected with the brake elements for moving them laterally in response to lateral movement of the wheel and axle assembly to maintain the brake elements in lateral alignment with the wheels.

2. In a brake mechanism for a vehicle having a frame supported by a laterally movable wheel and axle assembly, two hanger levers one for each wheel of said assembly each provided at its upper end with a jaw, two clevis blocks one disposed in each jaw and each pivotally attached to the lever by means of a pin extending through the jaw longitudinally of the vehicle and to said frame by means of a pin extending transversely of the locomotive, whereby said pins and said blocks form universal joints which permit the lower ends of said levers to swing toward and away from the associated wheels and also to rock in directions transversely of the vehicle frame, brake elements secured to said hanger levers for cooperation with the associated wheels, a brake beam connecting the lower ends of said hanger levers, means connected with said brake beam for moving said levers toward and away from the wheels to move said brake elements into and out of braking engagement with the wheels, a tie rod connecting said brake elements at points located close to the wheels, and means connected with the brake elements for moving them laterally in response to lateral movement of said wheel and axle assembly to maintain the brake elements in lateral alignment with the wheels.

3. In combination, a railway vehicle including a frame and a frame supporting wheel and axle assembly which is free to move laterally a limited distance relative to said frame as well as a member which moves laterally with said assembly, a brake beam supported at one side of the wheels of said assembly and connected with brake elements for frictionally engaging the wheels, said brake beam and said brake elements being free to move laterally an amount equal to the permissible lateral movement of said wheel and axle assembly, means connecting said member with said brake elements to maintain said brake elements in lateral alignment with the wheels, and means for moving said brake beam toward and away from the wheels to braking and non-braking positions including a vertically disposed transmitting lever connected at its lower end with said brake beam and secured at its upper end to said frame by means which permits the lower end of the lever to move both laterally and longitudinally of said vehicle.

4. In combination, a railway vehicle including a frame and a frame supporting wheel and axle assembly which is free to move laterally a limited distance as well as a member which moves laterally with said assembly, a pair of hanger levers suspended from said frame adjacent one side of the wheels of said assembly by means of universal joints, brake heads carrying brake shoes for cooperation with the wheels secured to said levers intermediate their ends, a brake beam connecting the lower ends of said hanger levers, means connecting said member with said brake heads to maintain the brake shoes in lateral alignment with the wheels, and means for moving said brake beam toward and away from the wheels to braking and non-braking positions in a manner which permits the necessary lateral movement of the brake heads and shoes, comprising a transmitting lever connected at its lower end by means of a pull rod with said beam and secured at its upper end to said frame by a universal joint.

5. In combination, a railway vehicle including a frame and a frame supporting wheel and axle assembly which is free to move laterally a limited distance as well as a member which moves laterally with said assembly, a brake beam supported at one side of the wheels of said assembly and connected with brake elements for frictionally engaging the wheels, said brake beam and said brake elements being free to move laterally an amount equal to the permissible lateral movement of said wheel and axle assembly, means connecting said member with said brake elements to maintain said brake elements in lateral alignment with the wheels, means for moving said brake beam toward and away from the wheels to braking and non-braking positions including a vertically disposed transmitting lever connected at its lower end with said brake beam and secured at its upper end to said frame by means which permits the lower end of the lever to move both laterally and longitudinally of said vehicle, and a pull rod connected at one end to said transmitting lever intermediate its ends by a jaw which is free to swivel about the axis of said pull rod.

6. In combination, a railway vehicle including a frame and a frame supporting wheel and axle assembly which is free to move laterally a limited distance as well as a member which moves laterally with said assembly, a pair of hanger levers suspended from said frame adjacent one side of the wheels of said assembly by means of universal joints, brake heads carrying brake shoes for cooperation with the wheels secured to said levers intermediate their ends, a brake beam connecting the lower ends of said hanger levers, means connecting said member with said brake heads to maintain the brake shoes in lateral alignment with the wheels, and means for moving said brake beam toward and away from the wheels to braking and non-braking positions in a manner which permits the necessary lateral movement of the brake heads and shoes comprising a transmitting lever connected at its lower end by means of a first pull rod with said beam and secured at its upper end to said frame by a universal joint and connected intermediate its end with a second pull rod through the medium of a jaw which is free to swivel about the axis of said second pull rod.

7. In combination, a railway vehicle including a frame and a frame supporting wheel and axle assembly which is free to move laterally a limited distance as well as a member which moves laterally with said assembly, a pair of hanger levers suspended from said frame adjacent one side of the wheels of said assembly by means of universal joints, brake heads carrying brake shoes for cooperation with the wheels secured to said levers intermediate their ends, a brake beam connecting the lower ends of said hanger levers, a tie rod connecting said brake heads close to said wheels to prevent the brake shoes from riding laterally off of the taper of the wheel treads when said brake shoes are moved into braking engagement with the wheels, means connecting said member with said tie rod to maintain the brake shoes in lateral alignment with the wheels, and means for moving said brake beam toward and away from the wheels to braking and non-braking positions in a manner which permits the necessary lateral movement of the brake heads and shoes comprising a transmitting lever connected at its lower end by means of a pull rod with said beam and secured at its upper end to said frame by a universal joint.

8. In a brake mechanism for a railway vehicle including a brake beam mounted on the vehicle for movement toward and away from a pair of wheels to braking and non-braking positions and also laterally with respect to the vehicle, the combination of actuating means for said brake beam comprising a first pull rod connected at one end with said brake beam intermediate its ends, a transmitting lever suspended from the vehicle by a universal joint and connected at its lower end with the free end of said first pull rod, a second pull rod provided at one end with a jaw which is free to swivel about the axis of the rod and connected by means of said jaw with said transmitting lever intermediate its ends and connected at the other end with power means for actuating said pull rod.

9. In a brake mechanism for a railway vehicle including a brake beam mounted on the vehicle for movement toward and away from a pair of wheels to braking and non-braking positions and also laterally with respect to the vehicle, the combination of actuating means for said brake beam comprising a first pull rod connected at one end with said brake beam intermediate its ends, a transmitting lever suspended from the vehicle by a universal joint and connected at its lower end with the free end of said first pull rod, a second pull rod provided at one end with a jaw which is free to swivel about the axis of the rod and connected by means of said jaw with said transmitting lever intermediate its ends, said second pull rod being suspended from the vehicle at its free end by a hanger link, an equalizer lever pivotally attached intermediate its ends to said pull rod intermediate its ends, and power means connected with the free ends of said equalizer lever.

10. In combination, a railway vehicle including a frame and a frame supporting wheel and axle assembly which is free to move laterally a limited distance as well as a member which moves laterally with said assembly, brake beams supported on opposite sides of the wheels of said assembly and connected with brake elements for frictionally engaging the wheels to apply clasp brakes to the wheels, a pair of brake cylinders, a pair of brake cylinder levers pivotally supported intermediate their ends by means of hanger levers suspended from said frame and operatively connected at their upper ends with said brake cylinders, a vertically disposed transmitting lever suspended from said frame by means which permits movement of the free end of the lever both laterally and longitudinally of said vehicle, a first pull rod connecting the free end of said transmitting lever with one of said brake beams, a second pull rod connected at one end with said transmitting lever intermediate its ends by a jaw which is free to swivel about the axis of said second pull rod, said second pull rod being floatingly supported from said frame at its other end by a link suspended from the frame, a first equalizer lever pivotally attached intermediate its ends to said second pull rod intermediate its ends and connected at its ends with said brake cylinder levers at their points of support, means connecting the lower ends of said brake cylinder levers with the other brake beam, and means connecting said member with said brake elements to maintain them in lateral alignment with the wheels.

11. In a brake mechanism for a vehicle having a frame supported by at least two closely spaced wheel and axle assemblies one of which is arranged for lateral movement with respect to said frame, a first brake beam slidably supported between said wheel and axle assemblies some distance above their axes for movement between brake applying and brake releasing positions, two compound levers supported at their upper ends on the opposite ends of said first brake beam by means of bearing blocks mounted on rounded portions formed on said beam and disposed in square openings provided in the lever, each said bearing block having its upper and lower surface sloped or rounded from its center toward each end in a manner to permit the lower end of the associated lever to swing laterally at least as far as said one wheel and axle assembly is free to move laterally, a second brake beam supported by the lower ends of said levers by means of bearing blocks similar to those which support the upper ends of said levers for movement between brake applying and brake releasing positions, brake elements for cooperation with the wheels of said two pairs respectively secured to the levers adjacent their upper and lower ends, tie rods secured to the brake elements close to the wheels, means for moving the lower tie rod laterally in response to lateral movements of said laterally movable wheel and axle assembly for causing the brake shoes which cooperate with the laterally movable wheels thereof to remain at all times in lateral alignment with the wheels, and means connected with said brake beams for moving them in opposite directions to their brake applying positions.

12. In a brake mechanism for a vehicle having a frame supported by at least two closely spaced wheel and axle assemblies one of which is arranged for lateral movement with respect to said frame, a first brake beam slidably supported between said wheel and axle assemblies some distance above their axes for movement between brake supplying and brake releasing positions, two compound levers supported at their upper ends on the opposite ends of said first beam in such manner that their lower ends are free to move laterally and longitudinally of the locomotive, a second brake beam connected with the lower ends of said levers for movement between brake applying and brake releasing positions, brake elements secured to opposite sides of said compound levers above and below the axes of said wheel and axle assemblies and cooperating respectively with the wheels of said two pairs of wheel and axle assemblies, a third brake beam disposed at the side of said laterally movable wheel and axle assembly opposite to said second brake beam and supported by means of hanger levers in such manner that said third brake beam is free to move toward and away from the associated wheels to brake applying and brake releasing positions and also to swing laterally an amount equal to the permissible lateral movement of said laterally movable wheel and axle assembly, brake elements secured to said hanger levers for cooperation with the associated wheels, a fourth brake beam disposed at the side of the other wheel and axle assembly opposite to said second brake beam and suspended from the vehicle frame by means of hanger levers, brake elements secured to said last mentioned hanger levers for cooperation with the adjacent wheels, a first brake cylinder connected with said first brake beam for moving it to its brake applying position, second and third brake cylinders, two brake cylinder levers floatingly supported intermediate their ends from the vehicle frame and operatively connected at their upper ends with said second and third brake cylinder levers, a first pull rod connected at one end with said third brake beam intermediate its ends, a transmitting lever secured to the locomotive frame at one end by a universal joint and operatively connected at its other end with the free end of said first pull rod, a second pull rod connected at one end with said transmitting lever intermediate its ends by a jaw which is free to swivel about the axis of said second pull rod, said second pull rod being floatingly supported from said frame at its other end, a first equalizer lever pivotally attached intermediate its ends to said second pull rod intermediate its ends and connected at its ends with said brake cylinder levers at their points of support, third and fourth equalizer levers connected at their ends with said second brake beam at points equally spaced from its ends, a third pull rod connected at one end with the opposite end of each of said second and third equalizer levers and at the other end with said fourth brake beam intermediate its ends, and other pull rods connecting said second and third equalizer levers intermediate their ends with the lower ends of said brake cylinder levers.

13. In a brake mechanism for a vehicle having a frame supported by at least two closely spaced wheel and axle assemblies one of which is arranged for lateral movement with respect to said frame, a first brake beam slidably supported between said wheel and axle assemblies some distance above their axes for movement between brake applying and brake releasing positions, two compound levers supported at their upper ends on the opposite ends of said first beam in such manner that their lower ends are free to move laterally and longitudinally of the locomotive, a second brake beam connected with the lower ends of said levers for movement between brake applying and brake releasing positions, brake elements secured to opposite sides of said compound levers above and below the axes of said wheel and axle assemblies and cooperating respectively with the wheels of said two pairs of wheel and axle assemblies, a third brake beam disposed at the side of said laterally movable wheel and axle assembly opposite to said second brake beam and supported by means of hanger levers in such manner that said third brake beam is free to move toward and away from the associated wheels to brake applying and brake releasing positions and also to swing laterally an amount equal to the permissible lateral movement of said laterally movable wheel and axle assembly, brake elements secured to said hanger levers for cooperation with the associated wheels, a fourth brake beam disposed at the side of the other wheel and axle assembly opposite to said second brake beam and suspended from the vehicle frame by means of hanger levers, brake elements secured to said last mentioned hanger levers for cooperation with the adjacent wheels, a first brake cylinder connected with said first brake beam for moving it to its brake applying position, second and third brake cylinders, two brake cylinder levers floatingly supported intermediate their ends from the vehicle frame and operatively connected at their upper ends with said second and third brake cylinders, a first pull rod connected at one end with said third brake beam intermediate its ends, a transmitting lever secured to the locomotive frame at one end by a universal joint and operatively connected at its other end with the free end of said first pull rod, a second pull rod connected at one end with said transmitting lever intermediate its ends by a jaw which is free to swivel about the axis of said second pull rod, said second pull rod being floatingly supported from said frame at its other end, a first equalizer lever pivotally attached intermediate its ends to said second pull rod intermediate its ends and connected at its ends with said brake cylinder levers at their points of support, third and fourth equalizer levers connected at their ends with said second brake beam at points equally spaced from its ends, a third pull rod connected at one end with the opposite end of each of said second and third equalizer levers and at the other end with said fourth brake beam intermediate its ends, other pull rods connecting said second and third equalizer levers intermediate their ends with the lower ends of said brake cylinder levers, spring means connected with said first brake beam to move it to its brake applying position, and other spring means acting to offset any tendency of the brakes to drag due to said first mentioned spring means.

EMIL G. MUELLER.